(12) United States Patent
Nguyen et al.

(10) Patent No.: US 12,468,640 B2
(45) Date of Patent: Nov. 11, 2025

(54) SYSTEMS AND METHODS FOR SENDING A COMMAND TO A STORAGE DEVICE

(71) Applicant: Samsung Electronics Co., Ltd., Suwon-si (KR)

(72) Inventors: Marie Mai Nguyen, Pittsburgh, PA (US); Heekwon Park, San Jose, CA (US); Tong Zhang, Mountain View, CA (US); Ho Bin Lee, San Jose, CA (US); Rekha Pitchumani, Oak Hill (IS); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/123,252

(22) Filed: Mar. 17, 2023

(65) Prior Publication Data

US 2023/0297517 A1    Sep. 21, 2023

Related U.S. Application Data

(60) Provisional application No. 63/322,221, filed on Mar. 21, 2022.

(51) Int. Cl.
*G06F 12/14* (2006.01)
*G06F 12/02* (2006.01)

(52) U.S. Cl.
CPC ...... *G06F 12/1491* (2013.01); *G06F 12/0269* (2013.01); *G06F 2212/1052* (2013.01)

(58) Field of Classification Search
None
See application file for complete search history.

(56) References Cited

U.S. PATENT DOCUMENTS

| 7,930,487 B1 | 4/2011 | Faibish et al. |
| 9,213,717 B1 | 12/2015 | Pawar et al. |
| 9,389,787 B2 | 7/2016 | McCarthy et al. |
| 9,792,221 B2 | 10/2017 | Richter et al. |
| 10,635,598 B2 | 4/2020 | Veal et al. |
| 2013/0304979 A1* | 11/2013 | Zimmer ................ G06F 13/16 711/103 |

(Continued)

FOREIGN PATENT DOCUMENTS

EP    3018588 B1    4/2020

OTHER PUBLICATIONS

Ardestani, Ehsan K. et al., "Supporting Massive DLRM Inference through Software Defined Memory", 2022 IEEE 42nd International Conference on Distributed Computing Systems (ICDCS), Bologna, Italy, 2022, pp. 302-312.

(Continued)

*Primary Examiner* — Michael Alsip
(74) *Attorney, Agent, or Firm* — Renaissance IP Law Group LLP

(57) ABSTRACT

A method includes storing, at a computing device, access granularity criteria associated with a memory area. The method further includes receiving a memory operation request requesting access to a first portion of the memory area at the first access granularity. The method further includes in response to the memory operation request satisfying the access granularity criteria, sending, from the computing device, a command to a storage device based on the memory operation request.

20 Claims, 10 Drawing Sheets

(56) References Cited

U.S. PATENT DOCUMENTS

| | | | |
|---|---|---|---|
| 2020/0104275 A1 | 4/2020 | Sen et al. | |
| 2020/0257456 A1 | 8/2020 | Bernat | |
| 2021/0109666 A1* | 4/2021 | Palmer | G06F 3/0631 |
| 2021/0373951 A1 | 12/2021 | Malladi et al. | |
| 2022/0004488 A1 | 1/2022 | Paul et al. | |
| 2022/0405212 A1 | 12/2022 | Kakaiya et al. | |

OTHER PUBLICATIONS

Biswas, Arijit et al., "Next-Gen Intel Xeon CPU—Sapphire Rapids," in HotChips, 2021, 22 pages.

European Extended Search Report for Application No. 23163039.3, mailed Jul. 17, 2023.

Gray Jim N. et al., "Granularity of Locks in a Shared Data Base," Proceedings of the 1st International Conference on Very Large Data Bases, 1975, pp. 428-451.

Gupta, Udit et al., DeepRecSys: A System for Optimizing End-To-End At-Scale Neural Recommendation Inference,, 2020 ACM/IEEE 47th Annual International Symposium on Computer Architecture (ISCA), 2020, 14 pages.

Iyer, Ravi et al., "Advances in Microprocessor Cache Architectures Over the Last 25 Years," IEEE Micro, vol. 41, No. 6, 2021.

Lee, Gyusun et al., "Asynchronous I/O Stack: A Low-latency Kernel I/O Stack for Ultra-Low Latency SSDs," Proceedings of the 2019 USENIX Annual Technical Conference, ATC 2019, 2019, 15 pages.

Scales, Daniel J. et al., "Shasta: A Low Overhead, Software-Only Approach for Supporting Fine-Grain Shared Memory," Proceedings of the Seventh International Conference on Architectural Support for Programming Languages and Operating Systems, 1996, pp. 174-185.

Sethi, Geet et al., "RecShard: Statistical Feature-Based Memory Optimization for Industry-Scale Neural Recommendation," ASPLOS '22, 2022, 15 pages.

Yoon, Doe Hyun et al., "Adaptive Granularity Memory Systems: A Tradeoff Between Storage Efficiency and Throughput," Proceedings of the 38th Annual International Symposium on Computer Architecture, 2011, 12 pages.

* cited by examiner

SYSTEMS AND METHODS FOR SENDING A COMMAND TO A STORAGE DEVICE

CROSS-REFERENCE TO RELATED APPLICATION(S)

The present application claims priority to and the benefit of U.S. Provisional Application No. 63/322,221, filed Mar. 21, 2022 entitled "CXL SSD FOR THE NEXT-GEN DATA CENTER INFRASTRUCTURE," the entire contents of all which is incorporated herein by reference.

FIELD

The present disclosure generally relates to systems and methods for sending commands to a storage device.

BACKGROUND

A storage device may store data on behalf of an application executing at a computing device. During execution, the application may issue one or more commands to the storage device that may alter the data.

The above information disclosed in this background section is only for enhancement of understanding of the background of the disclosure and therefore it may contain information that does not constitute prior art.

SUMMARY

In various embodiments, described herein include systems, methods, and apparatuses related to sending commands to storage devices.

A method includes storing, at a computing device, access granularity criteria associated with a memory area. The method further includes receiving a memory operation request requesting access to a first portion of the memory area at the first access granularity. The method further includes in response to the memory operation request satisfying the access granularity criteria, sending, from the computing device, a command to a storage device based on the memory operation request.

A computer readable storage device storing instructions executable by a processor to perform operations including storing, at a computing device, access granularity criteria associated with a memory area. The operations further include receiving a memory operation request requesting access to a first portion of the memory area at the first access granularity. The operations further include, in response to the memory operation request satisfying the access granularity criteria, sending, from the computing device, a command to a storage device based on the memory operation request.

A system includes a storage device and a computing device. The computing device is configured to store access granularity criteria associated with a memory area of the storage device. The computing device is further configured to receive a memory operation request requesting access to a first portion of the memory area at the first access granularity. The computing device is further configured to, in response to the memory operation request satisfying the access granularity criteria, send a command to the storage device based on the memory operation request.

BRIEF DESCRIPTION OF THE DRAWINGS

The above-mentioned aspects and other aspects of the present techniques will be better understood when the present application is read in view of the following figures in which like numbers indicate similar or identical elements.

DETAILED DESCRIPTION OF DRAWINGS

Figure 1:
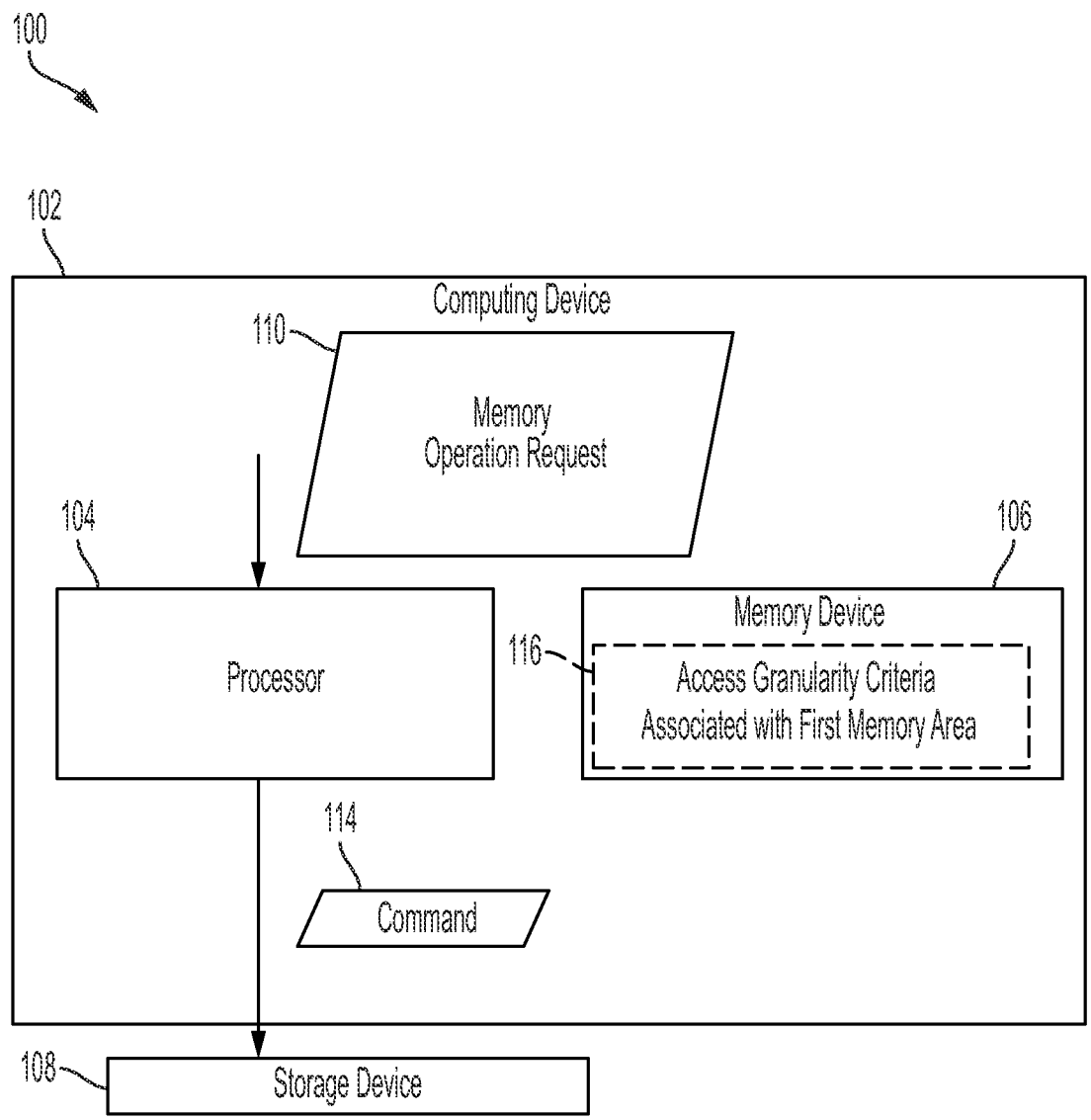
FIG. 1 is a diagram of a system for sending commands to a storage device.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Systems and methods for sending commands to a storage device are disclosed. These systems and methods may selectively send requested commands to a storage device be based on access granularity in order to maintain a coherent view of data stored at the storage device.

A storage device may support accesses of varying granularity. For example, the storage device may support block level (e.g., 4 kilobytes (KB), 512 bytes (B), etc.) and byte level access. Other granularities may be supported by the storage device and more than two granularities may be supported. Accessing a memory area at different granularities may result in corrupted data. For example, different granularity access paths may have different caching systems. Accordingly, altering a particular memory address using one granularity access may cause coherency issues if another access path has cached the memory address. The disclosure provides systems and methods for controlling memory accesses based on granularity of the access (or an associated factor, such as an access path associated with a granularity). Accordingly, the disclosed systems and methods may provide coherent access to a storage device at various granularities.

Referring to FIG. 1, a system 100 for sending commands to a storage device is shown. The system 100 may support more than one access granularity for memory commands. The system 100 includes a computing device 102 and a storage device 108. The computing device 102 includes a processor 104 and a memory device 106.

The processor 104 includes a central processor unit (CPU), a graphics processor unit (GPU), a field programmable gate array (FPGA), an application specific integrated circuit (ASIC), another type of processor, or any combination thereof. The processor 104 may be implemented with a complex instruction set computer (CISC) architecture, a reduced instruction set computer (RISC) architecture, another type of computer architecture, or any combination thereof.

The memory device 106 includes volatile memory, non-volatile memory, another type of memory, or any combination thereof. Examples of volatile memory include dynamic random access memory (DRAM), static random access memory (SRAM), resistive random access memory (ReRAM), etc. Examples of non-volatile memory include read only memory (ROM), programmable read only memory (PROM), erasable PROM (EPROM), electrically erasable PROM (EEPROM), flash memory, hard disk drive, etc.

The computing device 102 may correspond to personal computer, a mobile phone device, a server computer, another type of computer, or any combination thereof. The storage device 108 includes volatile memory, non-volatile memory, another type of memory, or any combination thereof. In some implementations, the storage device 108 is a component of the computing device 102.

The computing device 102 is connected, directly or indirectly, to the storage device 108. An indirect connection refers to a connection that includes an intermediate device, whereas an indirect connection refers to a connection that does not include an intermediate device. A connection may be wireless or wired. As will be discussed further herein, In a particular example, the computing device 102 communicate with the storage device 108 using compute express link (CXL) protocol (or another cache coherent protocol) over a peripheral component interconnect express (PCIe) link (or other link).

The memory device 106 stores access granularity criteria 116 associated with a memory area. The access granularity criteria 116 may be an association between the memory area and a first access granularity (e.g., 4 KB, 64B, etc.). The access granularity criteria 116 may be placed in the memory device 106 by an application executed by the processor 104, by an operating system executed by the processor 104, by other software executed by the processor 104, or by another source. The memory area may correspond to a physical memory space (e.g., address range) of the storage device 108 or to a virtualized address space that may be translated to addresses of the storage device 108. In some examples, the memory area corresponds to a file or a region of a file. The access granularity criteria 116 may be explicitly between the memory area and the first access granularity or may be between the memory area and an attribute correlated with the first access granularity. For example, the access granularity criteria 116 may between the memory area and an access path, protocol, etc. that correlates to the first access granularity. In a particular example, the access granularity criteria 116 corresponds to lock indicating that the memory area is to be accessed exclusively using the first granularity (or corresponding attribute, such as an access path, protocol, etc.). In another example, the memory area may include a physical address range of the storage device 108 that may be mapped to more than one virtual memory address used by the computing device 102. Each of the more than one virtual memory addresses may be utilized by the computing device 102 to access the physical address range at a different granularity. The access granularity criteria 116 between the memory area and the first access granularity may correspond to a lock on one or more of the more than one virtual memory addresses.

In operation, the processor 104 receives a memory operation request 110 (e.g., a read command, a write command, or another type of memory access command). The memory operation request 110 may be received from an application executing at the processor 104 in some examples. The memory operation request 110 indicates a first portion of the memory area. Based on (e.g., in response to) the memory operation request 110, the processor 104 may determine that a memory operation request 110 satisfies (e.g., has an access granularity indicated as permitted for the memory area, is associated with an access protocol that is permitted to access the memory area, targets a virtual memory address that is associated with the memory area and is unlocked, targets a virtual memory address that is not locked, etc.) the access granularity criteria 116. Based on the memory operation request 110 satisfying the access granularity criteria 116, the processor 104 may issue a command 114 that is based on the memory operation request 110 to the storage device. The command 114 may simply be the memory operation request 110 or may correspond to a translation of the memory operation request 110. The command 114 corresponds to a memory operation (e.g., a read, write, etc.) targeting the first portion of the memory area at the first granularity. Accordingly, commands that satisfy the stored access granularity criteria 116 may be passed to the storage device 108 by the processor 104.

In a particular example, the memory operation request 110 indicates that the memory area is to be accessed using a non-volatile memory express (NVMe) protocol over CXL.io (e.g., accesses according to this protocol may be associated with a 4 KB granularity). The access granularity criteria 116 may correspond to a lock that indicates the memory area (e.g., a range of physical addresses on the storage device 108) is locked to NVMe protocol (e.g., 4 KB granularity) access). The processor 104 may confirm that the access granularity criteria 116 is satisfied by a first access granularity (e.g., the NVMe protocol command type of the memory operation request 110) of the memory operation request 110, and based on the determination, issue the command 114 to the storage device 108. In this example, the command 114 may correspond to an NVMe command.

In another example, the access granularity criteria 116 may indicate that a virtual memory address range utilized by a load/store access path (e.g., a CXL.mem path) to access a physical address range of the storage device at a 64B granularity is unlocked. The memory operation request 110 may target a virtual memory address in the unlocked virtual memory address range. Accordingly, the processor 104 may pass the command 114 on to the storage device 108. The command 114 may include the virtual memory address or a translation of the virtual memory address. Alternatively, the access granularity criteria 116 may not include information regarding the virtual memory address range utilized by the load/store access path (e.g., may not include a lock for this range). In this case too, the processor 104 may consider the virtual memory address to satisfy the access granularity criteria.

Controlling access to the storage device 108 based on requested access granularity (or associated attribute, such as access path/protocol/etc.) may provide a mechanism for coherent access to the storage device 108 at different granularities.

Figure 2:
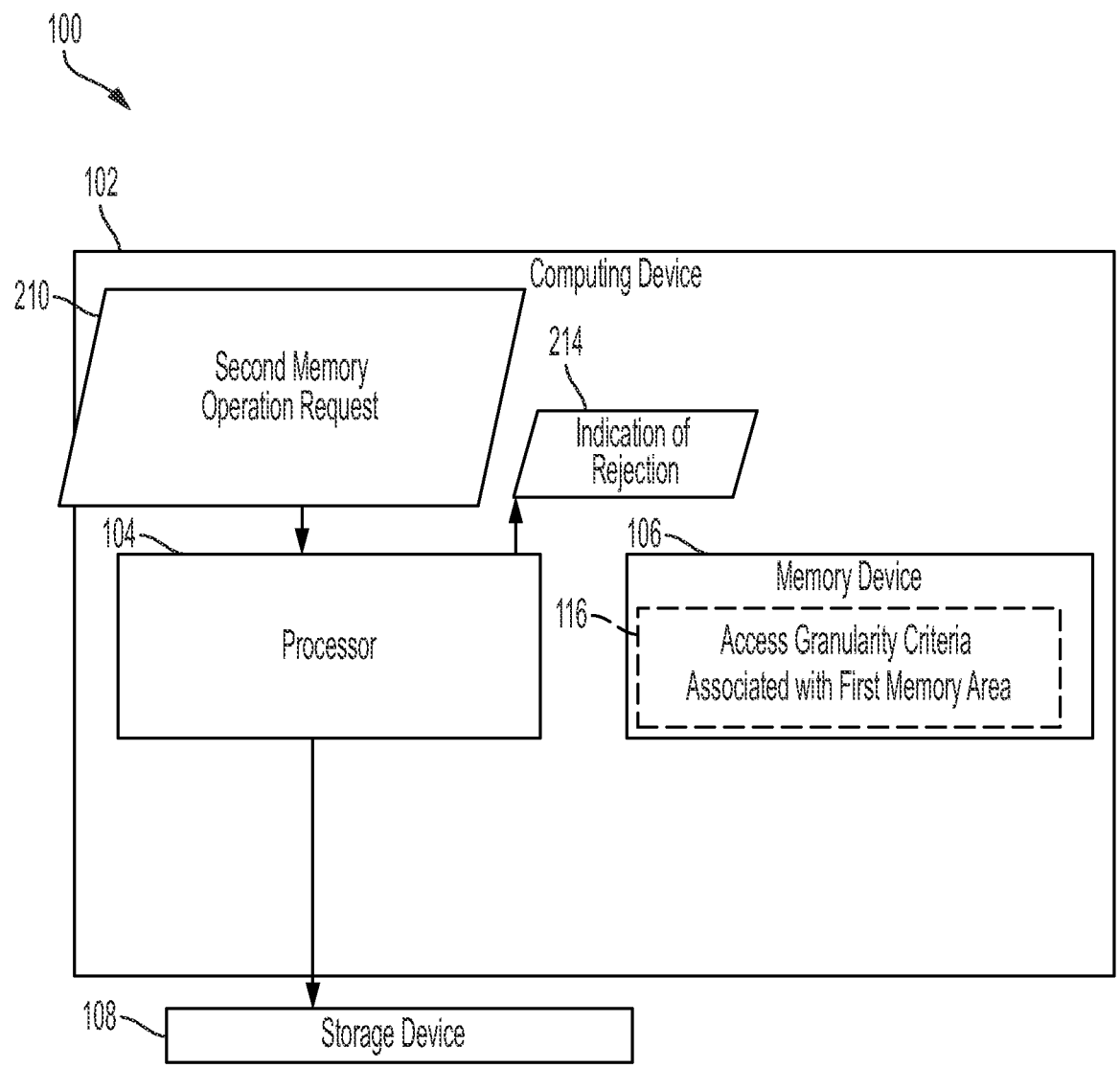
FIG. 2 is another diagram of the system for sending commands to the storage device.

FIG. 2 illustrates an example in which the system 100 rejects a memory operation request based on access granularity. In operation, the processor 104 receives a second memory operation request 210 (e.g., a read command, a write command, or another type of memory access command). The second memory operation request 210 may be received from an application executing at the processor 104 in some examples. The second memory operation request 210 indicates a second portion of the memory area. Based on (e.g., in response to) the second memory operation request 210, the processor 104 may determine that a second access granularity of the second memory operation request 210 fails to satisfy the access granularity criteria 116 (e.g., has a different access granularity than is not permitted to access the memory area, is associated with a protocol or access path that is not permitted to access the memory area, targets a virtual address that is associated with the memory area and is locked, etc.). Based on the second memory operation request 210 failing to satisfy the access granularity criteria 116, the processor 104 may issue an indication of rejection 214 (e.g., to an application that generated the second memory operation request 210). Accordingly, requests that do not satisfy the stored access granularity criteria 116 may be rejected by the processor 104.

In a particular example, the second memory operation request 210 indicates that the memory area is to be accessed using a load or store operation over CXL.mem (e.g., accesses according to this protocol may be associated with a 64B granularity). The access granularity criteria 116 may correspond to a lock that indicates the memory area (e.g., a range of physical addresses on the storage device 108) is locked to NVMe protocol (e.g., 4 KB granularity) access). The processor 104 may confirm that the access granularity criteria 116 is not satisfied by the second memory operation request 210 (e.g., the load/store command type of the second memory operation request 210), and based on the determination, issue the indication of rejection 214.

In another example, the access granularity criteria 116 may indicate that a virtual memory address range utilized by an NVMe access path to access a physical address range of the storage device at a block granularity is locked. The second memory operation request 210 may target a virtual memory address in the locked virtual memory address range. Accordingly, the processor 104 may issue the rejection 214.

Rejecting access to a memory location in the storage device 108 based on requested access granularity (or associated attribute, such as access path, protocol, targeted virtual address, etc.) may prevent access to a memory location by different access paths that have different caching systems. Accordingly, coherency of data stored in the storage device 108 may be maintained.

Figure 3:
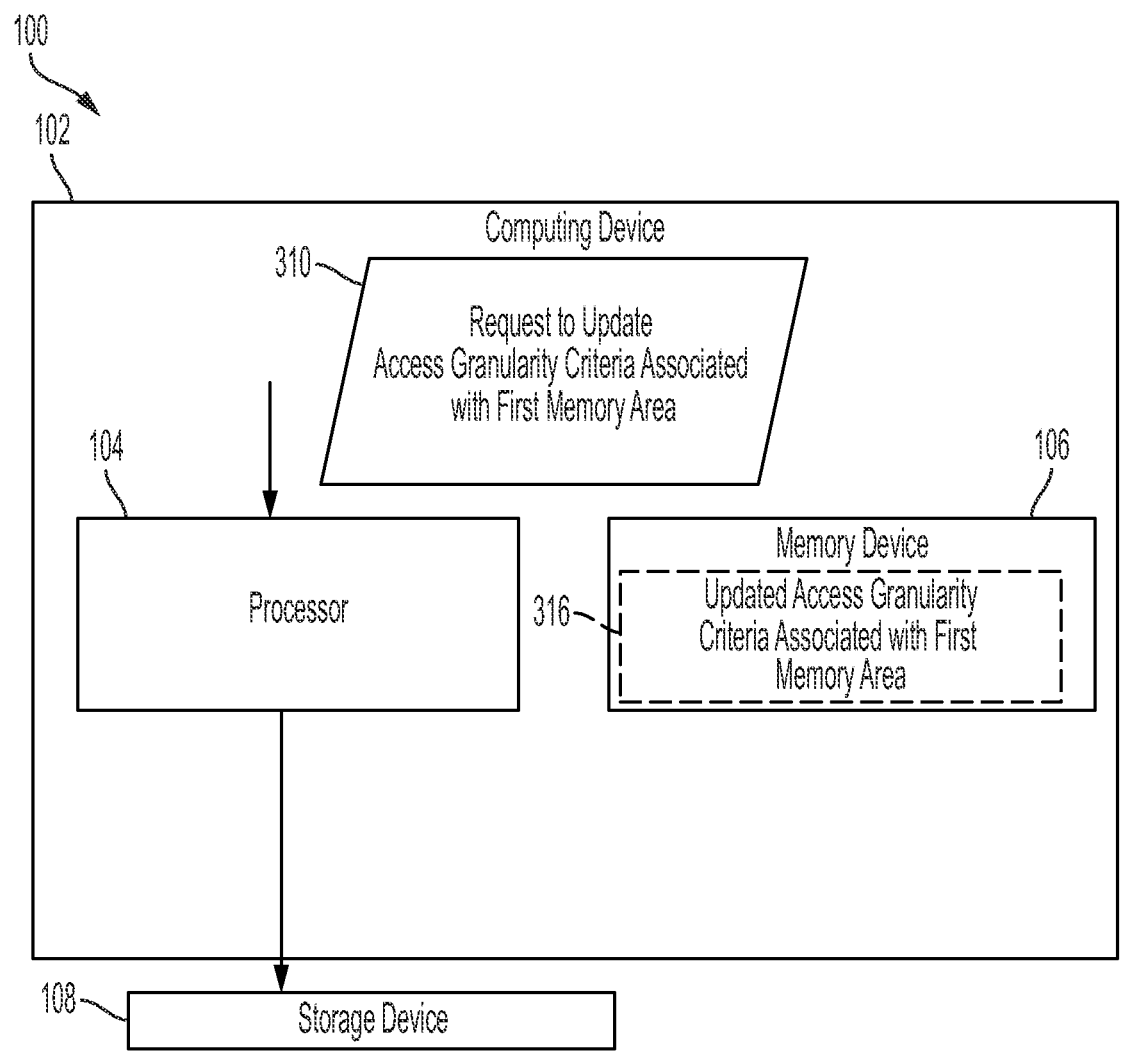
FIG. 3 is another diagram of the system for sending commands to the storage device.

FIG. 3 illustrates an example in which the system 100 updates an access granularity criteria. In operation, the processor 104 receives a request 310 to update the access granularity criteria associated with the memory area. For example, the request 310 may indicate a new permitted access granularity, a new disallowed access granularity, a new permitted access path or protocol (e.g., associated with a particular access granularity), a new disallowed access path or protocol, a new unlocked virtual address (associated with a particular access granularity), a new locked virtual address, or a combination thereof. The request 310 may be received from an application or an operating system executing at the processor 104. The processor 104 stores updated access granularity criteria 316 in the memory device 306. The updated access granularity criteria 316 is associated with the memory area.

Figure 4:
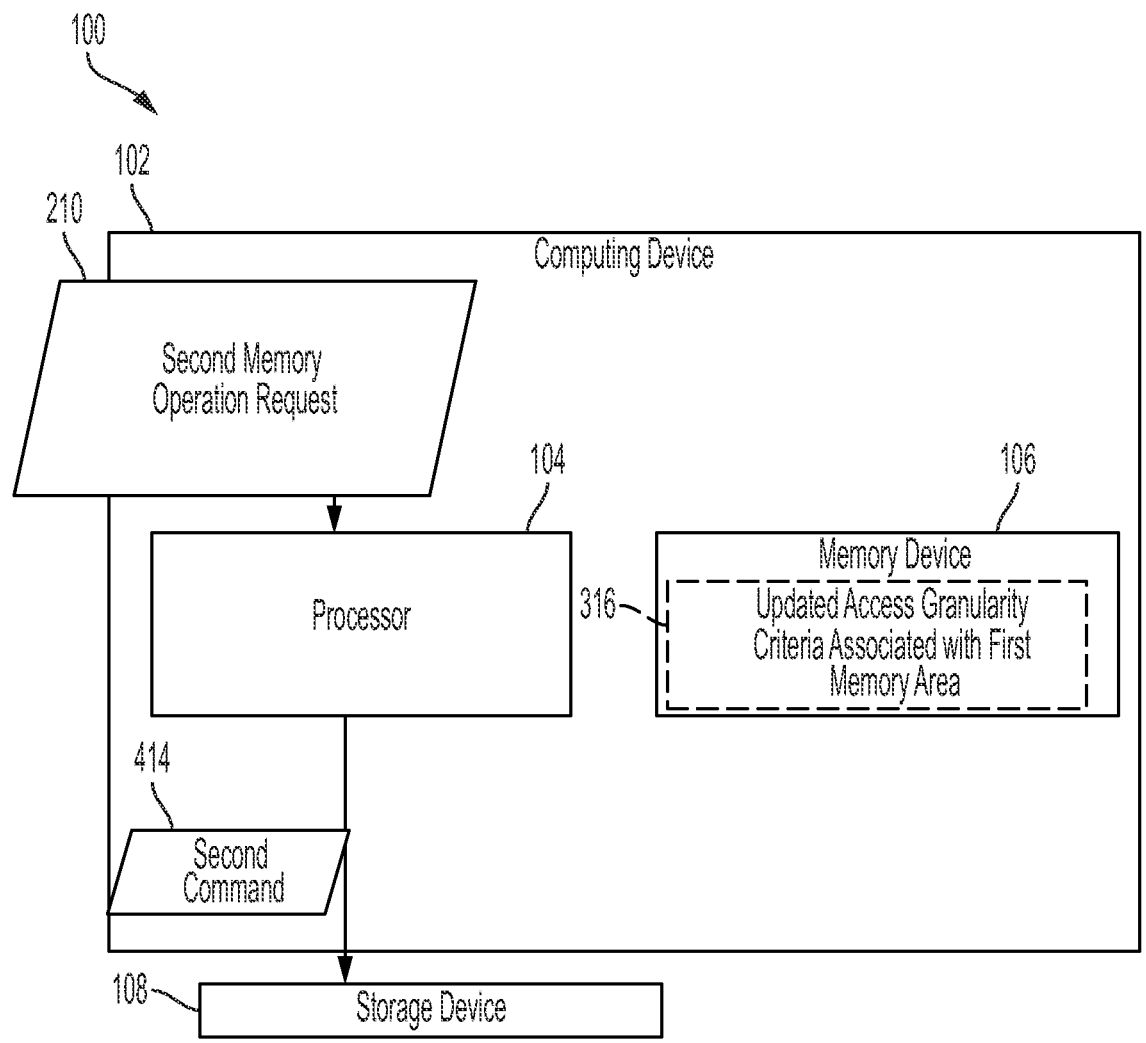
FIG. 4 is another diagram of the system for sending commands to the storage device.

FIG. 4 illustrates that the system 100 may send commands to the storage device 108 based on the updated access granularity criteria 316. In the illustrated example, the computing device 102 receives the second memory operation request 210. Based on the second memory operation request 210 satisfying the updated access granularity criteria 316, the processor 104 issues a second command 414 to the storage device. Determination by the processor 104 that the second memory operation request 210 satisfies the updated access granularity criteria 316 may follow the same process as determination by the processor 104 that the memory operation request 110 satisfies the access granularity criteria 116 described with respect to FIG. 1.

Accordingly, the system 100 may switch between supported access granularities for a particular memory area in the storage device 108. In some implementations, once the system 100 locks the particular memory area to a particular access granularity, memory access requests at other granularities are disallowed until the lock is removed (e.g., by an application executing at the processor 104).

The system 100 of FIGS. 1-4 may include various components other than those shown. For example, the computing device 102 may include additional processors, communications interfaces, memory devices, output devices, etc. Further, the storage device 108 may include a processor, storage media, communications interfaces, etc.

Figure 5:
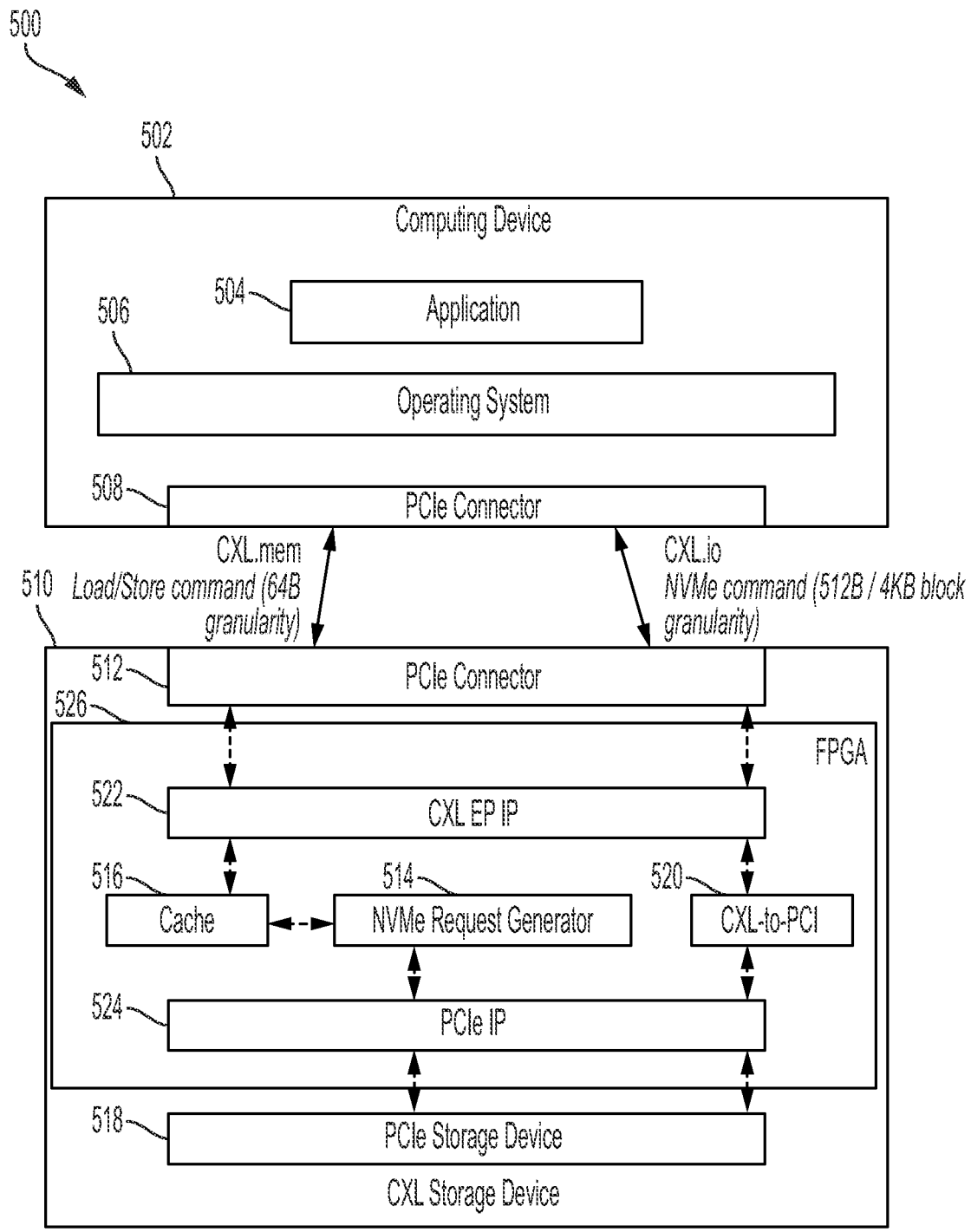
FIG. 5 is a diagram of another system for sending commands to a storage device.

Referring to FIG. 5 a system 500 that controls commands sent to a CXL storage device based on access granularity is shown. The system 500 may correspond to the system 100 described above. The system 500 includes a computing device 502 and a CXL storage device.

The computing device 602 executes an application 604 and an operating system 606. The computing device 602 may correspond to the computing device 102 of FIG. 1. The computing device 602 may include a personal computer, a mobile device, such as a smart phone device, a server computer, or other type of computing device. The computing device 502 executes (e.g., at a processor, such as the processor 104) an application 504 and an operating system 506. The application 504 may correspond to any computing application that accesses memory. In some implementations, the application 504 includes a deep learning recommendation model (DLRM) application. DLRM applications may access relatively large amounts of data (e.g., terabytes). Accordingly, data accesses at a first, relatively large, granularity (e.g., 512 B or 4 KB blocks) may be efficient. However, some functions of the DLRM application may depend on a relatively small amount of data. Accessing the relatively small amount of data using the first access granularity may result in movement of more data that the DLRM application will use for some functions. Accordingly, data accesses at a second, relatively smaller, granularity (e.g., 64B) may be more efficient for some functions.

The operating system 506 manages memory spaces accessible to the application 504. Managing the memory spaces may include translating between virtual addresses used by the application 504 and addresses recognized by the CXL storage device 510 (e.g., physical addresses or further virtual addresses). In some implementations, the operating system 506 sends commands of a first access granularity (e.g., NVMe commands) to the CXL storage device 510 over a first protocol (e.g., CXL.io) and sends commands of a second access granularity (e.g., memory load/store commands) over a second protocol (e.g., CXL.mem). Managing the memory spaces may further include placing locks (e.g., access criteria) on portions of memory (e.g., memory ranges, objects (such as files), etc.). In some instances, a locks may restrict all access to a portion of memory, restrict access to a particular access granularity, restrict access to a particular access protocol (e.g., NVMe, load/store, CXL.mem, CXL.io, etc.), restrict access to another criteria, or a combination thereof.

The computing device includes a PCIe connector 508. The PCIe connector 508 may include a u.2 connector, an m.2 connector, or another type of connector.

The CXL storage device 510 includes a PCIe connector 512, an FPGA 526, and a PCIe storage device 518. The PCIe storage device 518 may include a solid state drive, hard disk drive, other storage device, or a combination thereof configured to operate over PCIe. The CXL storage device 510 is configured to provide access to the PCIe storage device 518 over the PCIe connector 512 at more than one access granularity. The PCIe connector 512 may include a u.2 connector, an m.2 connector, or another type of connector.

The FPGA 526 includes a CXL endpoint (EP) intellectual property (IP) block 522. The CXL EP IP 522 block 522 is configured to manage CXL protocol messages exchanged between the computing device 502 and the CXL storage device 510.

The FPGA 526 further includes a cache 516. The cache 516 may include DRAM, SRAM, another type of memory, or a combination thereof. The cache 516 is configured to cache data retrieved from the PCIe storage device 518 at a first granularity (e.g., 512B or 4 KB blocks) to provide access at a second granularity (e.g., 64B granularity). The cache 516 may further be configured to store data to be written to the PCIe storage device 518 at the second granularity. This data may eventually be written to the PCIe storage device 518 at the first granularity.

The FPGA 526 further includes a NVMe request generator IP block 514. The NVMe request generator IP block 514 is configured to generate NVMe requests based on signals from the CXL EP IP block 522. These NVMe requests are sent to the PCIe storage device 518. For example, the CXL EP IP block 522 may instruct the NVMe request generator IP block 514 to generate an NVMe request for a block of data in response to a cache miss at the cache 516.

The FPGA 526 further includes a CXL-to-PCI IP block 520. The CXL-to-PCI IP block 520 is configured to convert messages received over CXL.io (e.g., NVMe over CXL messages) to PCIe messages (e.g., NVMe over PCIe) based on signals from the CXL EP IP block 522. For example, the CXL-to-PCI IP block 520 may extract a NVMe read request from a CXL.io messages and encapsulate the NVMe read request in a PCIe message for transmission to the PCIe storage device 518.

The FPGA 526 further includes a PCIe IP block 524. The PCIe IP block 524 is configured to exchange PCIe messages with the PCIe storage device 518. In some examples, the PCIe IP block includes a u.2 connector, an m.2 connector, or another type of PCIe connector.

In a first example operation, the application 504 sends a write command targeting a virtual address to the operating system 506. The operating system 506 translates the virtual address to a translated address associated with the CXL storage device 510, generates an NVMe command targeting the translated address, and sends the NVMe command to the CXL storage device 510 over the PCIe connector 508 using the CXL.io protocol. The CXL storage device 510 receives the NVMe command at the PCIe connector 512. The CXL EP IP block 522 forwards the NVMe over CXL.io message to the CXL-to-PCI IP block 520. The CXL-to-PCI IP block 520 converts the NVMe over CXL.io message to an NVMe over PCIe message and sends this to the PCIe IP block 524 for transmission to the PCIe storage device 518. Based on the NVMe command, the PCIe storage device 518 writes data to the PCIe storage device at the first granularity (e.g., 512B or 4 KB block).

In a second example operation, the application 504 sends a read command targeting a virtual address to the operating system 506. The operating system 506 translates the virtual address to a translated address associated with the CXL storage device 510, generates an NVMe command targeting the translated address, and sends the NVMe command to the CXL storage device 510 over the PCIe connector 508 using the CXL.io protocol. The CXL storage device 510 receives the NVMe command at the PCIe connector 512. The CXL EP IP block 522 forwards the NVMe over CXL.io message to the CXL-to-PCI IP block 520. The CXL-to-PCI IP block 520 converts the NVMe over CXL.io message to an NVMe over PCIe message and sends this to the PCIe IP block 524 for transmission to the PCIe storage device 518. Based on the NVMe command, the PCIe storage device 518 returns data to the computing device 502 at the first granularity.

In a third example operation, the application 504 sends a store command targeting a virtual address to the operating system 506. The operating system 506 translates the virtual address to a translated address associated with the CXL storage device 510, generates a memory store command targeting the translated address, and sends the memory store command to the CXL storage device 510 over the PCIe connector 508 using the CXL.mem protocol. The CXL storage device 510 receives the memory store command at the PCIe connector 512. The CXL EP IP block 522 determines whether the translated address is cached in the cache 516. In response to the cache 516 caching the translated address, the CXL EP IP block 522 is configured to overwrite a cache entry for the translated address at a second access granularity (e.g., 64B). In response to a cache miss for the translated address, the CXL EP IP block 522 is configured to store data in the cache 516 in a new entry. The CXL EP IP block 522 is configured to trigger writes to the NVMe request generator IP block 514 to generate a NVMe request to write data to the PCIe storage device 518 at the first granularity according to a cache eviction policy. The PCIe IP block 518 transfers the NVMe request to the PCIe storage device 518 and the PCIe storage device 518 writes the data at the first granularity to storage media of the PCIe storage device 518.

In a fourth example operation, the application 504 sends a load command targeting a virtual address to the operating system 506. The operating system 506 translates the virtual address to a translated address associated with the CXL storage device 510, generates a memory load command targeting the translated address, and sends the memory load to the CXL storage device 510 over the PCIe connector 508 using the CXL.mem protocol. The CXL storage device 510 receives the memory load command at the PCIe connector 512. The CXL EP IP block 522 determines whether the translated address is cached in the cache 516. In response to the cache 516 caching the translated address, the CXL EP IP block 522 is configured to return a cache entry for the translated address at a second access granularity (e.g., 64B) to the computing device 502. In response to a cache miss for the translated address, the CXL EP IP block 522 is configured to the NVMe request generator IP block 514 to generate a NVMe request to requesting data at the translated address from the PCIe storage device 518 at the first granularity. The PCIe IP block 518 transfers the NVMe request to the PCIe storage device 518 and the PCIe storage device 518 returns the data at the first granularity to the FPGA 526 for storage in the cache 516. The CXL EP IP block 522 then returns an entry of the cache 516 at the second granularity to the computing device 502.

Accordingly, the CXL storage device 510 supports access at more than one access granularity despite an underlying storage device supporting one access granularity by implementing a first access path that operates at a native access granularity of the PCIe storage device 518 (e.g., CXL.io) and a second access path (e.g., CXL.mem) that utilizes a cache to cache data from the underlying storage device at the first access granularity so that the data can be accessed and manipulated at the second access granularity with fewer transactions sent to the underlying storage device. Since different caching structures are used in each access path, the computing device 502 may receive conflicting views of data stored in the PCIe storage device 518 if a particular physical address of the PCIe storage device 518 were to be accessed over both paths simultaneously. In order to prevent an incoherent view of data stored at the PCIe storage device 518, the computing device 502 manages accesses to the CXL storage device 510 based on access granularity criteria, as described herein.

It should be noted that the system 500 is provided for illustration purposes and may be modified or replaced with other systems that provide accesses to a storage device at varying access granularities. For example, the computing device 502 and the CXL storage device 510 may communicate over a protocol other than PCIe, such as Ethernet. As another example, the CXL storage device 510 may be replaced with a storage device that supports other multi-protocol access. Accordingly, the computing device 502 may send access requests over protocols other than CXL.io and CXL.mem. As another example, the FPGA 526 may be replaced by an ASIC, a central processor unit, or other type of processor. In some implementations, functionality of the FPGA 526 is implemented by a controller (e.g., an ASIC or other processing device) of the PCIe storage device 518. Accordingly, the computing device 502 may communicate directly with the PCIe storage device 518 over a PCIe connection. In some implementations, the PCIe storage device 518 may be replaced with another type of storage device, such as a serial ATA (SATA), universal serial bus, serial attached SCSI (SAS), or other type of storage device. Further, the storage device may operate according to a protocol other than NVMe. As with other diagrams illustrated and described herein, additional components than those illustrated may be included in examples.

Figure 6:
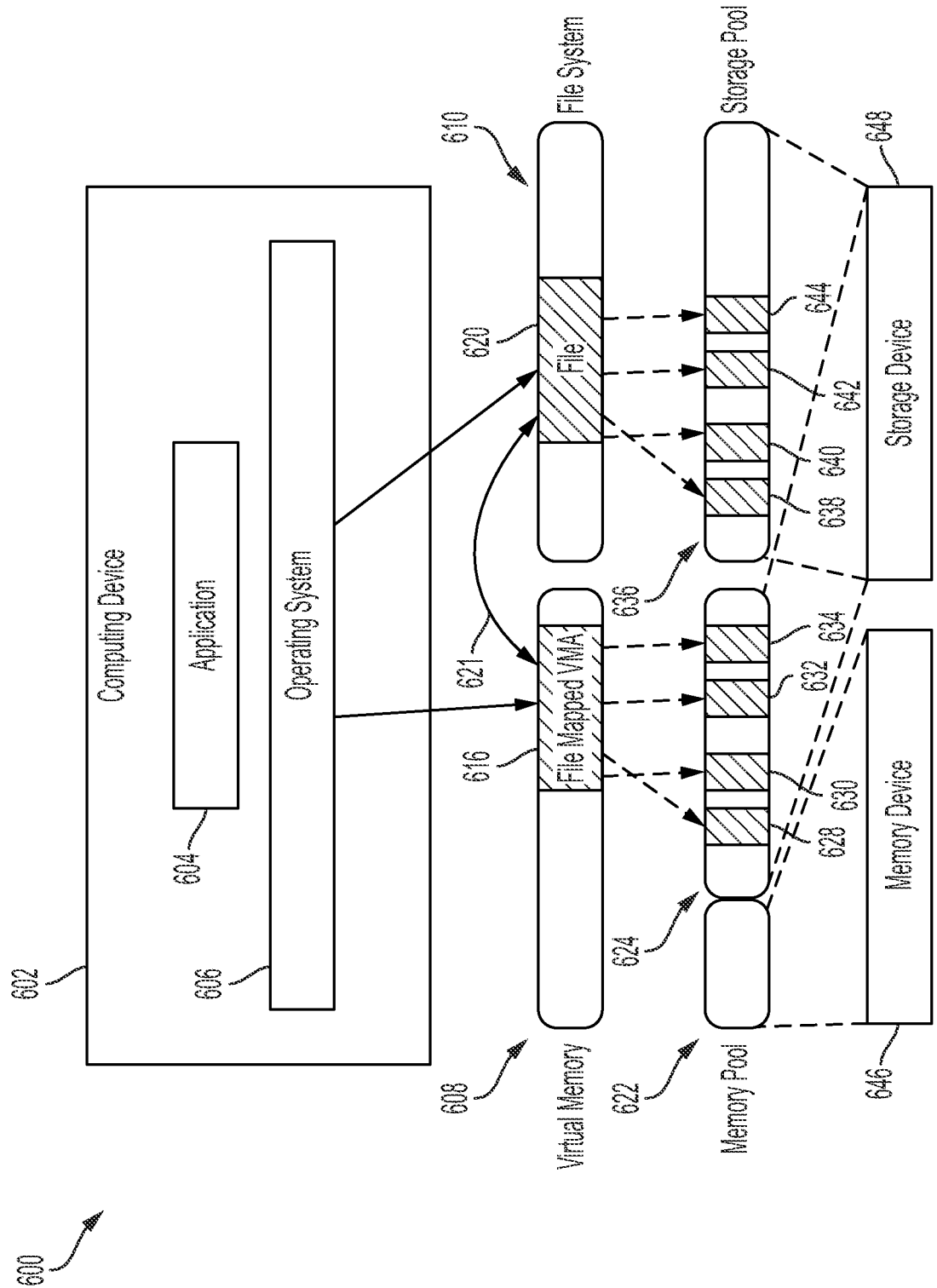
FIG. 6 is a diagram of another system for sending commands to a storage device.

FIG. 6 is a diagram illustrating abstraction of memory address space in a system 600 for sending commands to a storage device. In some examples, the system 600 corresponds to the system 100 or to the system 500. The system 600 includes a computing device 602, such as the computing device 102 or the computing device 502. The computing device 602 executes an application 604 and an operating system 606. The application 604 accesses one or more memory spaces managed by the operating system 606. The application 604 may correspond to the application 504 and the operating system 606 may correspond to the operating system 506.

The system 600 further includes a memory device 646 and a storage device 648. The memory spaces managed by the operating system 606 may correspond to physical storage space in the memory device 646, in the storage device 648, or a combination thereof. The memory device 646 may include a volatile memory device, such as a DRAM, SRAM, etc. The storage device 648 may include non-volatile memory, such as a solid state drive, a hard disc drive, another type of non-volatile memory or a combination thereof. The storage device 648 may also include volatile memory. In some examples, the memory device 646, the storage device 648, or a combination thereof correspond to components of the CXL storage device 510. The storage device 648 may correspond to the PCIe storage device 518.

The operating system 606 provides a file system 610 space for first access granularity memory operations to the application 604. Further, the operating system 606 provides a virtual memory address range 616 to the application 604 for second granularity memory access operations.

The operating system 606 is configured to map the virtual memory 608 to a memory pool including a first portion 622 and a second portion 624. For example, the operating system 606 may receive a memory access request (e.g., a load or store operation) from the application 604. The memory access request may identify a virtual address in the virtual memory 608. The operating system 606 may then translate the virtual address to a translated address in the memory pool and output a command including the translated address to the storage device 648 (e.g., the CXL storage device 510 or the storage device 108).

Further, the operating system 606 is configured to map the file system 610 to a storage pool 636. For example, the operating system 606 may receive a memory access request (e.g., a read or write request) from the application 604. The memory access request may identify a virtual address or object in the file system 610. The operating system 606 may then translate the virtual address or address to a translated address in the storage pool 636 and output a command including the translated address to the storage device 648 (e.g., the CXL storage device 510 or the storage device 108).

The operating system 606 is configured to send memory accesses for the first portion 622 of the memory pool to the memory device 646 and memory accesses for the second portion 624 of the memory pool to the storage device 648. The storage device 648 is configured to map the second portion 624 of the memory pool to physical addresses in the storage device 648. The storage device 648 is further configured to map the storage pool 636 to physical addresses in the storage device 648. Accordingly, physical addresses in the storage device 648 may be accessible by both a first path through the file system 610 and a second path through the virtual memory 608. The application 604 may issue memory access requests of a first granularity to the file system 610 and issue memory access requests of a second granularity to the virtual memory 608.

In operation, the application 604 may issue a command to write a file 620 to the file system 610. The operating system 606 may then issue commands (e.g., NVMe commands) to write the file to the storage pool 636 at first storage pool location 638, second storage pool location 640, at third storage pool location 642, and at fourth storage pool location 644. The storage device 648 may translate the storage pool locations 638, 640, 642, 644 to physical addresses in the storage device 648 and write the file to the physical addresses.

The application 604 may further issue a memory mapping command 621 to the operating system 606 to map a file in the file system 610 to the virtual memory 608 at virtual memory address range 616. Based on the memory mapping command 621, the operating system 606 places the file at a file mapped virtual memory address range 616 in the virtual memory 608 and instructs the storage device 648 to place the file 620 into the second portion 624 of the memory pool at first location 628, second location 630, third location 632, and fourth location 634. Rather than moving the data in the storage device 648, the storage device 648 may map the physical addresses of the file 620 in the storage device 648 to the locations 626, 628, 630, 632 in the second portion 624 of the memory pool. In order to prevent an incoherent view of the file 620, the operating system 606 may place a lock on virtual addresses in the file system 610 corresponding to the file 620. Because memory accesses through the virtual memory 608 and the file system 610 use different access granularities, the lock may be considered an access granularity criteria. Based on the lock, the operating system 606 may deny memory access requests directed to the file 620 in the file system 610. Accordingly, the system 600 may provide a consistent view of the file 620 by employing access granularity based control of memory accesses.

In some implementations, the operating system 606 may create mappings between the locations 628, 630, 632, 634 and the physical address range in the storage device 648 in response to the memory mapping command 621 with no intervening commands. In other implementations, the operating system 606 may create mappings between the locations 628, 630, 632, 634 as memory access commands are received from the application 604 for corresponding portions of the file 620. For example, in response to an access request from the application 604 for a virtual memory address in the address range 616, the operating system 606 may add a first portion of the file 620 to the first location 628. Waiting to add portions of the file 620 to the memory pool may reduce overhead associated with creating and maintaining mappings (e.g., page tables) between the memory pool and the storage device 648.

The operating system 606 may release the lock based on a command from the application 604. In some implementations, releasing the lock on the file 620 in the file system 610 may include placing a lock on the virtual memory address range 616. Releasing the lock may further include the operating system 606 issuing a command to the storage device 648 (e.g., the CXL storage device 510 or the storage device 108) to flush cache (e.g., evict) entries associated with the virtual memory address range 616 to the storage device 648. For example, the operating system 506 may issue a command to the CXL EP IP block 522 to flush entries of the cache 516 corresponding to the memory locations 628, 630, 632, 634 to the PCIe storage device 518. Accordingly, the CXL EP IP block 522 may instruct the NVMe request generator IP block 514 to generate one or more NVMe requests to write the entries of the cache to the PCIe storage device 518 (e.g., at block granularity).

Figure 7:
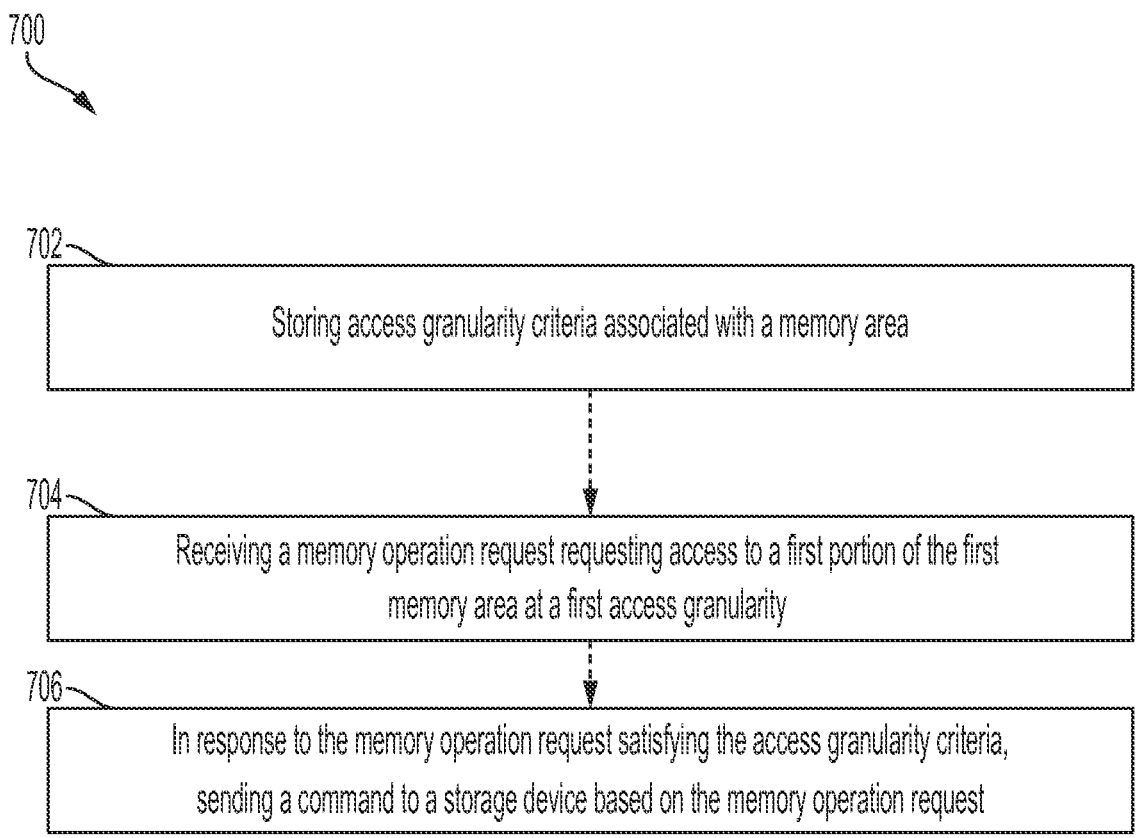
FIG. 7 is a flowchart of a method for sending commands to a storage device.

Referring to FIG. 7, a method 700 of sending commands to a storage device is shown. The method 700 may be performed by a computing device, such as the computing device 102, by the computing device 502, or the computing device 602. The method 700 includes storing access granularity criteria associated with a memory area, at 702. For example, the computing device 102 (e.g., the processor 104 of the computing device 102) may store access granularity criteria 116 associated with a memory area in the memory device 106. The access granularity criteria 116 may include a lock on a memory object (e.g., a file), a memory address (e.g., a virtual address or a physical memory address of the storage device 108), or a memory range (e.g., a virtual memory address range or a physical memory address range of the storage device 108). The memory object, memory address, or memory range may be associated with accessing data at the storage device 108 at a particular access granularity (e.g., over a particular access path, such as CXL.io or CXL.mem, associated with a particular access granularity). The lock may prevent access to particular physical addresses of the storage device 108 at the particular access granularity. The access granularity criteria 116 may correspond to an association between a memory object, a memory address, or a memory address range and an access granularity or a characteristic associated with an access granularity (such as an access path (e.g., CXL.io or CXL.mem) or access protocol (e.g., NVMe or memory load/store). The association may indicate that the access granularity is allowed or disallowed access to the memory object, memory address, or memory address range.

As another example, the operating system 506 may store a lock for a particular memory object, memory address, or memory address range associated with accessing a physical address of the PCIe storage device 518 using a block based NVMe commands or may store a lock for a particular memory object, memory address, or memory address range associated with accessing the physical address of the PCIe storage device 518 using byte addressable memory/load store commands.

As another example, the operating system 606 may store a lock preventing access to the file 620 in the file system 610. Accordingly, block level access to the file may be disabled. Alternatively, the operating system 606 may store a lock preventing access to the virtual memory address range 616. Accordingly, byte level access to the file may be disabled.

The method 700 further includes receiving a memory operation request requesting access to a first portion of the memory area at a first access granularity, at 704. For example, the processor 104 may receive the memory operation request 110 requesting access to a first portion of the memory area. The memory operation request 110 may explicitly indicate a requested access granularity or implicitly indicate the requested access granularity (e.g., based on an indicated memory address, memory object, memory range, access protocol, access path, etc.).

As another example, the application 504 may issue a memory operation command to the operating system 506. The memory operation command may include an address associated with using the CXL.mem path (e.g., byte level granularity) or CXL.io path (e.g., block level granularity) to access data stored at the PCIe storage device 518.

As another example, the application 604 may issue a memory operation command to the operating system 606. The memory operation command may include an address of the file system 610 (e.g., virtual addresses used for block level access of data on the storage device 648) or an address in the virtual memory 608 (virtual addresses used for byte level access of data on the storage device 648).

The method 700 further includes, in response to the memory operation request satisfying the access granularity criteria, sending a command to a storage device based on the memory operation request, at 706. For example, the processor 104 may send the command 114 in response to the memory operation request 110 satisfying the access granularity criteria 116 associated with the memory area. To illustrate, the processor 104 may send the command 114 in response to the access granularity criteria 116 indicating that an address targeted by the memory operation request 110 is unlocked (e.g., by including an explicit indication that the address is unlocked or by not including an indication that the address is locked) or in response to an access granularity or associated characteristic of the memory operation request 110 corresponding to a permitted access granularity or associated characteristic for the memory area, as indicated by the access granularity criteria 116.

As another example, the operating system 506 may issue a command to the CXL storage device 510 over CXL.mem or CXL.io in response to determining that the target address of a request from the application 504 is unlocked.

As another example, the operating system 606 may issue a command to the storage device 648 in response to determining that the target address of a request from the application 604 is unlocked.

Thus, the method 700 may selectively issue memory commands to a storage device based on access granularity criteria. Accordingly, the method 700 may be utilized in a system that supports multiple access granularities for accesses to a storage device in order to present a coherent view of data in the storage device. In some implementations, a storage device, such as the CXL storage device 510, may perform the method 700 to selectively issue commands to another storage device (e.g., the PCIe storage device 518). For example, the CXL EP IP block 522 of the FPGA 526 may be configured to perform the method 700.

Figure 8:
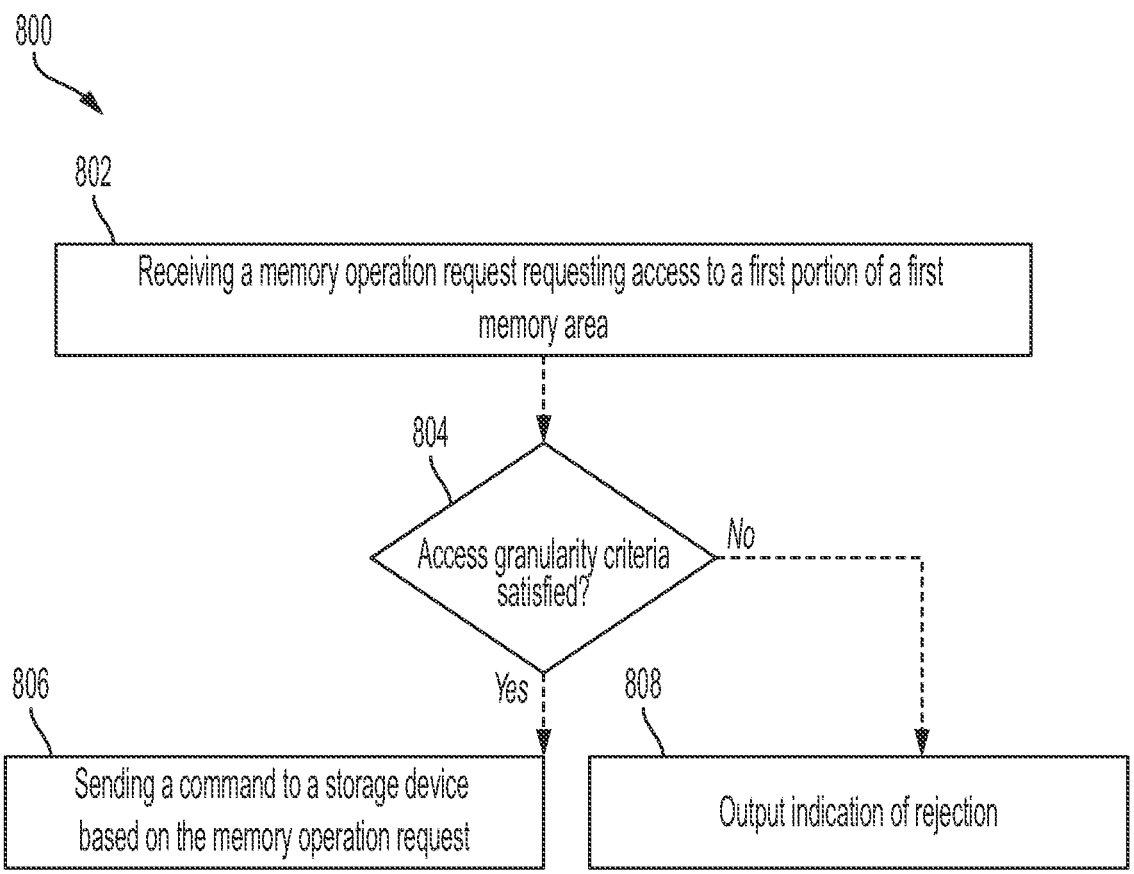
FIG. 8 is a flowchart of another method for sending commands to a storage device

Referring to FIG. 8, a method 800 of selectively sending or rejecting commands to a storage device is shown. The method 800 may be performed by a computing device, such as the computing device 102, the computing device 502, or the computing device 602. Further the method 800 may be performed by a storage device that manages access to another storage device (e.g., by the CXL storage device 510).

The method 800 includes receiving a memory operation request requesting access to a first portion of a memory area, at 802. For example, the processor 104 may receive the memory operation request 110 or a second memory operation request 210 (e.g., from an application executing at the processor 104). The requests 110, 210 may include a memory load request, a memory store request, a write request (e.g., NVMe write), a read request (e.g., NVMe read), another type of memory access, or a combination thereof. The requests 110, 210 may target a memory area (e.g., a physical memory range) of the storage device 108.

The method 800 further includes determining whether the memory operation request satisfies access granularity criteria, at 804. For example, the processor 104 may determine whether the memory operation request 110 or the memory operation request 210 satisfies the access granularity criteria 116 associated with the memory area. This determination may include determining whether the requests 110, 210 target a locked (or unlocked) memory address, memory address range, memory object, etc., as indicated by the access granularity criteria 116. The determination may include determining whether an access granularity or associated characteristic (e.g., access path, access protocol, etc.) of the requests 110, 210 satisfies an association stored in the access granularity criteria 116. The access granularity criteria 116 may indicate allowed accesses, disallowed accesses, or a combination thereof.

The method 800 further includes sending a command to a storage device based on the memory operation request in response to the memory operation request satisfying the access granularity criteria, at 804. For example, the processor 104 may send the command 114 to the storage device 108 in response to the memory operation request 110 satisfying the access granularity criteria 116. The command may correspond to a translation of the memory operation request 110. For example, the command 114 may include a translation of an address indicated by the memory operation request 110, the command 114 may be translated into a different protocol compared to the memory operation request 110, the command 114 may encapsulate the memory operation request 110, or a combination thereof.

The method 800 further includes outputting an indication of rejection in response to the memory operation request failing to satisfy the access granularity criteria, at 806. For example, the processor 104 may output the indication of rejection 214 in response to the second memory operation request 210 failing to satisfy the access granularity criteria 116. The indication of rejection 214 may be output to an application executing at the processor 104. In some implementations, the indication of rejection 214 corresponds to an error message or to an error flag.

Thus, the method 800 may selectively send memory commands or rejections based on access granularity criteria. Accordingly, The method 800 may present a coherent view of data stored at a storage device that supports multiple access granularities (e.g., over different access paths).

Figure 9:
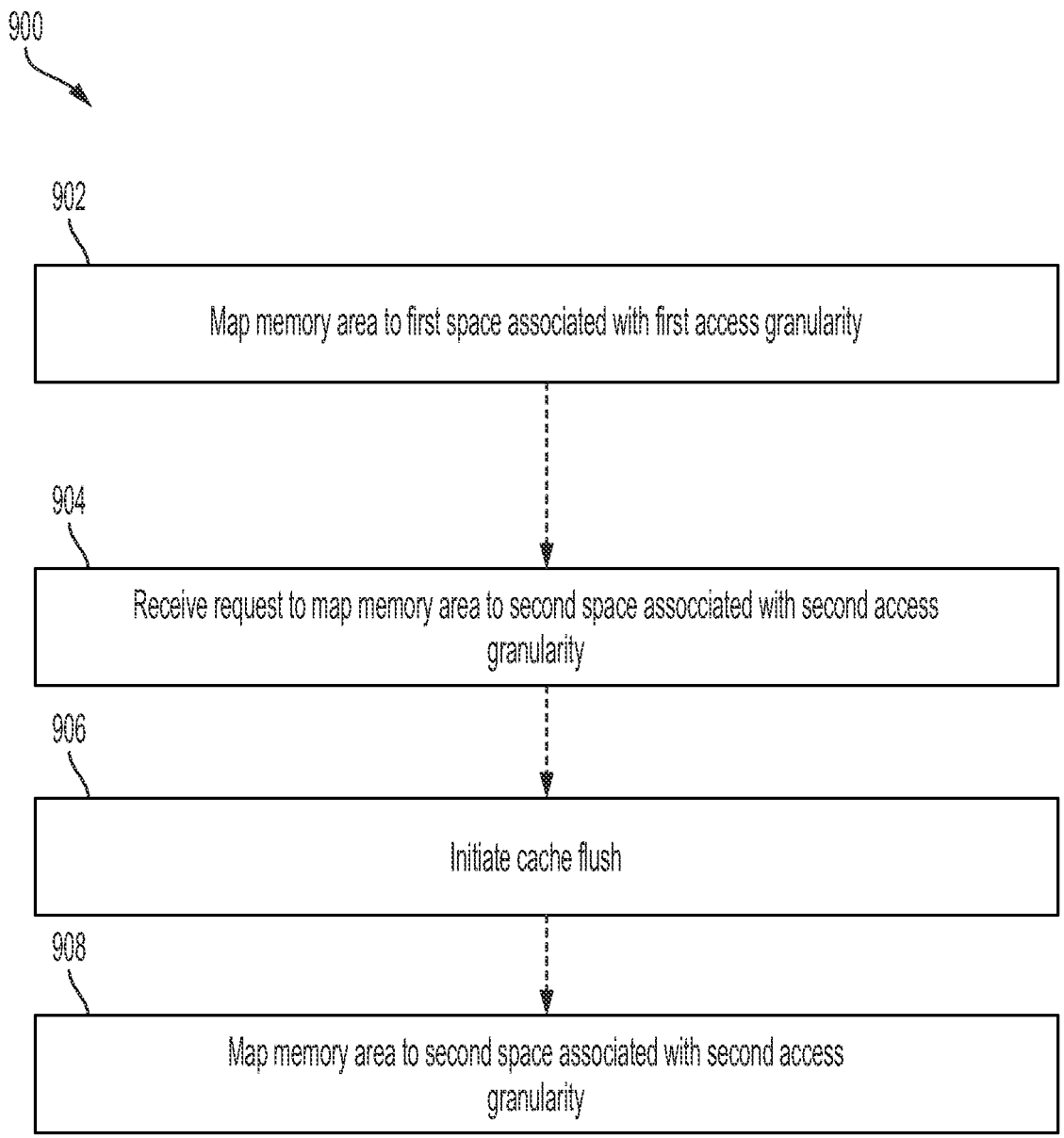
FIG. 9 is a flowchart of a method for flushing a cache.

Referring to FIG. 9, a method 900 of mapping a memory area to a second space is shown. The method 900 may be performed by a computing device, such as the computing device 102, the computing device 502, or the computing device 602. Further the method 800 may be performed by a storage device that manages access to another storage device (e.g., by the CXL storage device 510).

The method 900 includes mapping a memory area to a first space associated with first access granularity, at 902. For example, the operating system 606 may place the file 620 in the file system 610 and map the file 620 in the file system 610 to storage pool locations 638, 640, 642, 644. The storage pool locations 638, 640, 642, 644 may be mapped (e.g., by the operating system 606 or by the storage device 648, such as the CXL storage device 510) to physical addresses in the storage device 648 (e.g., memory area). The location of the file 620 in the file system 610 or the storage pool locations 638, 640, 642, 644 may correspond to the first space. Accessing the file 620 through the file system 610 is associated with a first access granularity (e.g., 512B or 5 KB blocks).

In another example, the operating system 506 may map virtual addresses associated with CXL.mem access to a physical address range of the PCIe storage device 518 at 64B granularity.

The method 900 further includes receiving a request to map the memory area to a second space associated with a second access granularity, at 904. For example, the operating system 606 may receive the memory mapping command 621 from the application 604. The memory mapping command 621 may request that the file 620 be placed into the virtual memory 608. The virtual memory 608 is associated with a second access granularity (e.g., 64B).

In another example, the operating system 506 may receive a request to map the physical address range of the PCIe storage device 518 to virtual addresses associated with CXL.io access at 512B or 4 KB block granularity.

The method 900 further includes imitating a cache flush, at 906. For example, the operating system 606 may flush any caches of data stored at the file system 610 maintained by the computing device 602, the storage device 648, or the storage device 648.

In another example the operating system 506 may instruct the CXL EP IP block 522 to flush entries associated with the physical address range in the cache 516 to the PCIe storage device 518.

The method 900 further includes mapping the memory area to the second space associated with the second access granularity. For example, the operating system 606 may map the address range 616 in the virtual memory 608 to memory pool locations 626, 628, 630, 632 that are mapped to the physical address range of the storage device 648.

In another example, the operating system 506 maps the physical address range of the PCIe storage device 518 to virtual addresses associated with CXL.io access at 512B or 4 KB block granularity.

Thus, the method 900 may flush caches associated with one access granularity in response based on a request to access the data at another access granularity. It should be noted that more caches in an access path may be flushed than shown in the drawings. For example, the computing device 102, the computing device 502, or the computing device 602 may maintain one or more caches associated with one or more access granularities and these may be flushed based on requests to access data at a different access granularity.

Similarly, the storage device 108, the CXL storage device 510, the PCIe storage device 618, or the storage device 648 may include additional caching mechanisms than are illustrated. A caching mechanism associated with one access granularity may be flushed in response to a request to access data at a different access granularity.

Figure 10:
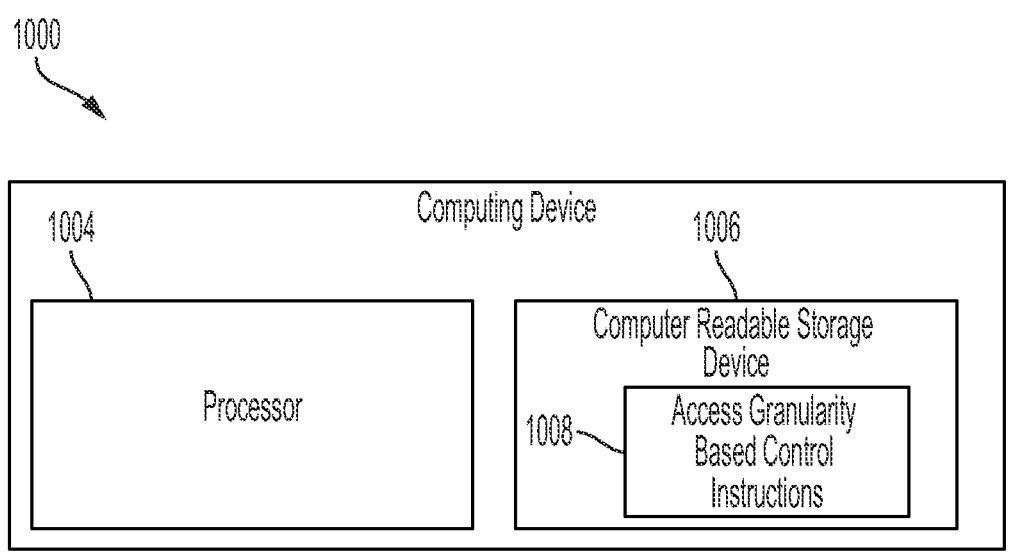
FIG. 10 is a diagram of a computing device that includes a computer readable storage device having instructions executable to send commands to a storage device While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

Referring to FIG. 10, a computing device 1000 is device including a processor 1004 and a computer readable storage device 1006 is shown. The computer readable storage device 1006 may include non-volatile memory, volatile memory, an optical storage device, another type of storage device, or a combination thereof. The computer readable storage device 1006 stores access granularity based control instructions 1008 that are executable by the processor 1004 to perform one or more of the methods or operations described herein with respect to FIGS. 1-9. A similar computer readable storage device may store instructions to program an FPGA to perform one or more of the operations described herein.

In some examples, X corresponds to Y based on X matching Y. For example, a first ID may be determined to correspond to a second ID that matches (e.g., has a same value as) the first ID. In other examples, X correspond to Y based on X being associated with (e.g., linked to) Y. For example, X may be associated to Y by a mapping data structure.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an radio frequency identification (RFID) element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. Elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The following statements describe examples according to the disclosure however the statements do not limit the scope of the disclosure.

Statement 1: A disclosed method includes storing, at a computing device, access granularity criteria associated with a memory area. The disclosed method further includes receiving a memory operation request requesting access to a first portion of the memory area at a first access granularity. The disclosed method further includes, in response to the memory operation request satisfying the access granularity criteria, sending, from the computing device, a command to a storage device based on the memory operation request.

Statement 2: The method of Statement 1, may further include receiving a second memory operation request requesting access to a second portion of the memory area at a second access granularity different from the first access granularity; and outputting, based on the access granularity criteria, an indication that the second memory operation request is rejected.

Statement 3: The method of either of Statements 1 or 2, may further include storing an updated access granularity criteria. The method may further include receiving a second memory operation request requesting access to a second portion of the memory area at a second access granularity. The method may further include, in response to the second memory operation request satisfying the updated access granularity criteria, sending, from the computing device, a second command to the storage device based on the second memory operation request.

Statement 4: In the method of Statement 3, the updated access granularity criteria, may be stored in response to a request from an application.

Statement 5: The method of either of Statements 4 or 5 may further include initiating a cache flush at the storage device.

Statement 6: In the method of any of Statements 1-5, the memory area may correspond to a file.

Statement 7: In the method of any of Statements 1-5, the memory area may correspond to a region of a file.

Statement 8: In the method of any of Statements 1-7, the memory area may correspond to a range of addresses in an address space.

Statement 9: In the method of any of statements 1-7, the access granularity criteria may correspond to a lock on a virtual memory address range associated with accessing the memory area at a second granularity.

Statement 10: A computer readable storage device may store instructions executable by a processor to perform operations including storing, at a computing device, access granularity criteria associated with a memory area. The operations may further include receiving a memory operation request requesting access to a first portion of the memory area at a first access granularity. The operations may further include, in response to the memory operation request satisfying the access granularity criteria, sending, from the computing device, a command to a storage device based on the memory operation request.

Statement 11: In the computer readable storage device of Statement 10, the operations may further include receiving a second memory operation request requesting access to a second portion of the memory area at a second access granularity different from the first access granularity. The operations may further include outputting, based on the access granularity criteria, an indication that the second memory operation request is rejected.

Statement 12: In computer readable storage device of either of Statements 10 or 11 the operations may further include storing an updated access granularity criteria. The operations may further include receiving a second memory operation request requesting access to a second portion of the memory area at a second access granularity. The operations may further include, in response to the second memory operation request satisfying the updated access granularity criteria, sending, from the computing device, a second command to the storage device based on the second memory operation request.

Statement 13: In the computer readable storage device of Statement 12, the updated access granularity criteria may be stored in response to a request from an application.

Statement 14: In the computer readable storage device of either of Statement 12 or 13, the operations may further include initiating a cache flush at the storage device.

Statement 15: In the computer readable storage device of any of Statements 11-14, the memory area may correspond to a file.

Statement 16: In the computer readable storage device of any of Statements 11-14, the memory area may correspond to a region of a file.

Statement 17: A system may include a storage device and a computing device. The computing device may be configured to store access granularity criteria associated with a memory area of the storage device. The computing device may further be configured to receive a memory operation request requesting access to a first portion of the memory area at a first access granularity. The computing device may further be configured to, in response to the memory operation request satisfying the access granularity criteria, send a command to the storage device based on the memory operation request.

Statement 18: In the system of Statement 17, the computing device may be further configured to receive a second memory operation request requesting access to a second portion of the memory area at a second access granularity different from the first access granularity. The computing device may further be configured to output, based on the access granularity criteria, an indication that the second memory operation request is rejected.

Statement 19: In the system of any of claims 17-18, the computing may be further configured to store an updated access granularity criteria. The computing device may be further configured to receive a second memory operation request requesting access to a second portion of the memory area at a second access granularity. The computing device may further be configured to, in response to the second memory operation request satisfying the updated access granularity criteria, send a second command to the storage device based on the second memory operation request.

Statement 20: In the system of any of Statements 17-19, the storage device may include a cache, and the computing device may further be configured to initiate eviction of an entry in the cache.

What is claimed is:

1. A method comprising:
    storing, at a computing device, access granularity criteria associated with a memory area;
    receiving a first memory operation request that is based on a first cache coherent protocol, the first memory operation request requesting access to a file associated with the memory area via a file system associated with accessing the memory area at a first access granularity;
    receiving a second memory operation request that is based on a second cache coherent protocol different from the first cache coherent protocol, the second memory operation request requesting access to the file via a virtual memory different from the file system, the virtual memory being associated with accessing the memory area at a second access granularity different from the first access granularity; and
    based on the access granularity criteria indicating that memory operation requests associated with the first cache coherent protocol are permitted to access the memory area, sending, from the computing device, a command to a storage device based on the first memory operation request.

2. The method of claim 1, further comprising:
    based on the access granularity criteria indicating that memory operation requests associated with the second cache coherent protocol are prohibited from accessing the memory area, outputting an indication that the second memory operation request is rejected.

3. The method of claim 1, further comprising:
    storing an updated access granularity criteria;
    receiving a third memory operation request requesting access to a second portion of the memory area at a third access granularity; and
    in response to the third memory operation request satisfying the updated access granularity criteria, sending, from the computing device, a second command to the storage device based on the third memory operation request.

4. The method of claim 3, wherein the updated access granularity criteria is stored in response to a request from an application.

5. The method of claim 3, further comprising initiating a cache flush at the storage device.

6. The method of claim 1, wherein the memory area corresponds to a file.

7. The method of claim 1, wherein the memory area corresponds to a region of a file.

8. The method of claim 1, wherein the memory area corresponds to a range of addresses in an address space.

9. The method of claim 1, wherein the access granularity criteria corresponds to a lock on the virtual memory address range associated with accessing the memory area at the second access granularity.

10. A computer readable storage device storing instructions executable by a processor to perform operations including:
    storing, at a computing device, access granularity criteria associated with a memory area;
    receiving a first memory operation request that is based on a first cache coherent protocol, the first memory operation request requesting access to a file associated with the memory area via a file system associated with accessing the memory area at a first access granularity;
    receiving a second memory operation request that is based on a second cache coherent protocol different from the first cache coherent protocol, the second memory operation request requesting access to the file via a virtual memory different from the file system, the virtual memory being associated with accessing the memory area at a second access granularity different from the first access granularity; and
    based on the access granularity criteria indicating that memory operation requests associated with the first cache coherent protocol are permitted to access the memory area, sending, from the computing device, a command to a storage device based on the first memory operation request.

11. The computer readable storage device of claim 10, wherein the operations further include:
    based on the access granularity criteria indicating that memory operation requests associated with the second cache coherent protocol are prohibited from accessing the memory area, outputting an indication that the second memory operation request is rejected.

12. The computer readable storage device of claim 10, wherein the operations further include:
    storing an updated access granularity criteria;
    receiving a third memory operation request requesting access to a second portion of the memory area at a third access granularity; and
    in response to the third memory operation request satisfying the updated access granularity criteria, sending, from the computing device, a second command to the storage device based on the third memory operation request.

13. The computer readable storage device of claim 12, wherein the updated access granularity criteria is stored in response to a request from an application.

14. The computer readable storage device of claim 12, wherein the operations further include initiating a cache flush at the storage device.

15. The computer readable storage device of claim 11, wherein the memory area corresponds to a file.

16. The computer readable storage device of claim 11, wherein the memory area corresponds to a region of a file.

17. A system comprising:
a storage device; and
a computing device configured to:
  store access granularity criteria associated with a memory area of the storage device;
  receive a first memory operation request that is based on a first cache coherent protocol, the first memory operation request requesting access to a file associated with the memory area via a file system associated with accessing the memory area at a first access granularity;
  receive a second memory operation request that is based on a second cache coherent protocol different from the first cache coherent protocol, the second memory operation request requesting access to the file via a virtual memory different from the file system, the virtual memory being associated with accessing the memory area at a second access granularity different from the first access granularity; and
  based on the access granularity criteria indicating that memory operation requests associated with the first cache coherent protocol are permitted to access the memory area, send, from the computing device, a command to a storage device based on the first memory operation request.

18. The system of claim 17, wherein the computing device is further configured to output, based on the access granularity criteria indicating that memory operation requests associated with the second cache coherent protocol are prohibited from accessing the memory area, an indication that the second memory operation request is rejected.

19. The system of claim 17, wherein the computing device is further configured to:
  store an updated access granularity criteria;
  receive a third memory operation request requesting access to a second portion of the memory area at a third access granularity; and
  in response to the third memory operation request satisfying the updated access granularity criteria, send a second command to the storage device based on the third memory operation request.

20. The system of claim 17, wherein the storage device includes a cache, and wherein the computing device is further configured to initiate eviction of an entry in the cache.

* * * * *